Figure 1:
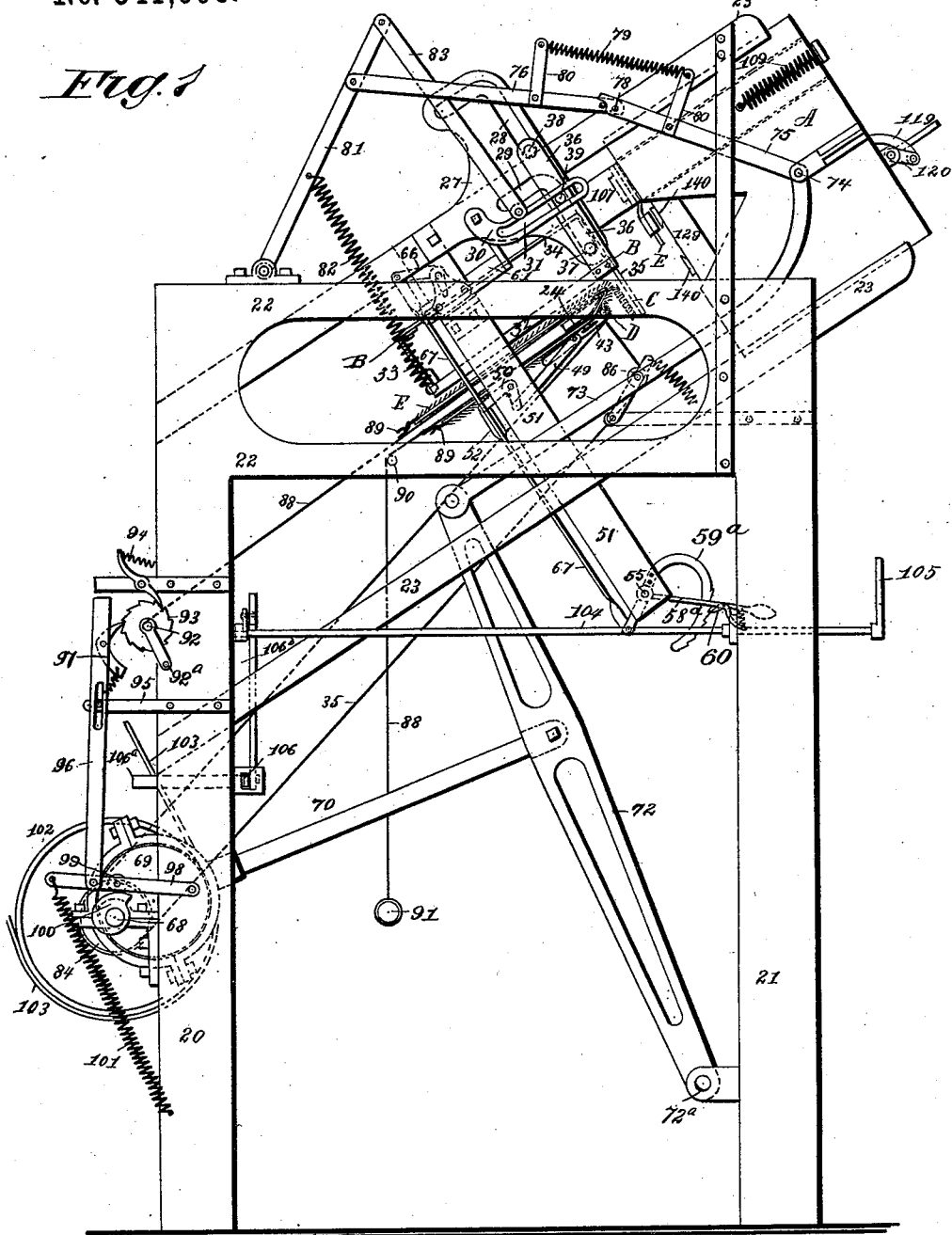

(No Model.) 9 Sheets—Sheet 1.

C. SCHIRMER.
MACHINE FOR DEHAIRING FUR SKINS.

No. 541,690. Patented June 25, 1895.

WITNESSES: INVENTOR
F. McArdle. C. Schirmer
C. Sedgwick BY
Munn & Co
ATTORNEYS.

(No Model.) 9 Sheets—Sheet 6.
C. SCHIRMER.
MACHINE FOR DEHAIRING FUR SKINS.
No. 541,690. Patented June 25, 1895.

WITNESSES: INVENTOR
C. Schirmer
BY
ATTORNEYS.

(No Model.) 9 Sheets—Sheet 7.
C. SCHIRMER.
MACHINE FOR DEHAIRING FUR SKINS.
No. 541,690. Patented June 25, 1895.
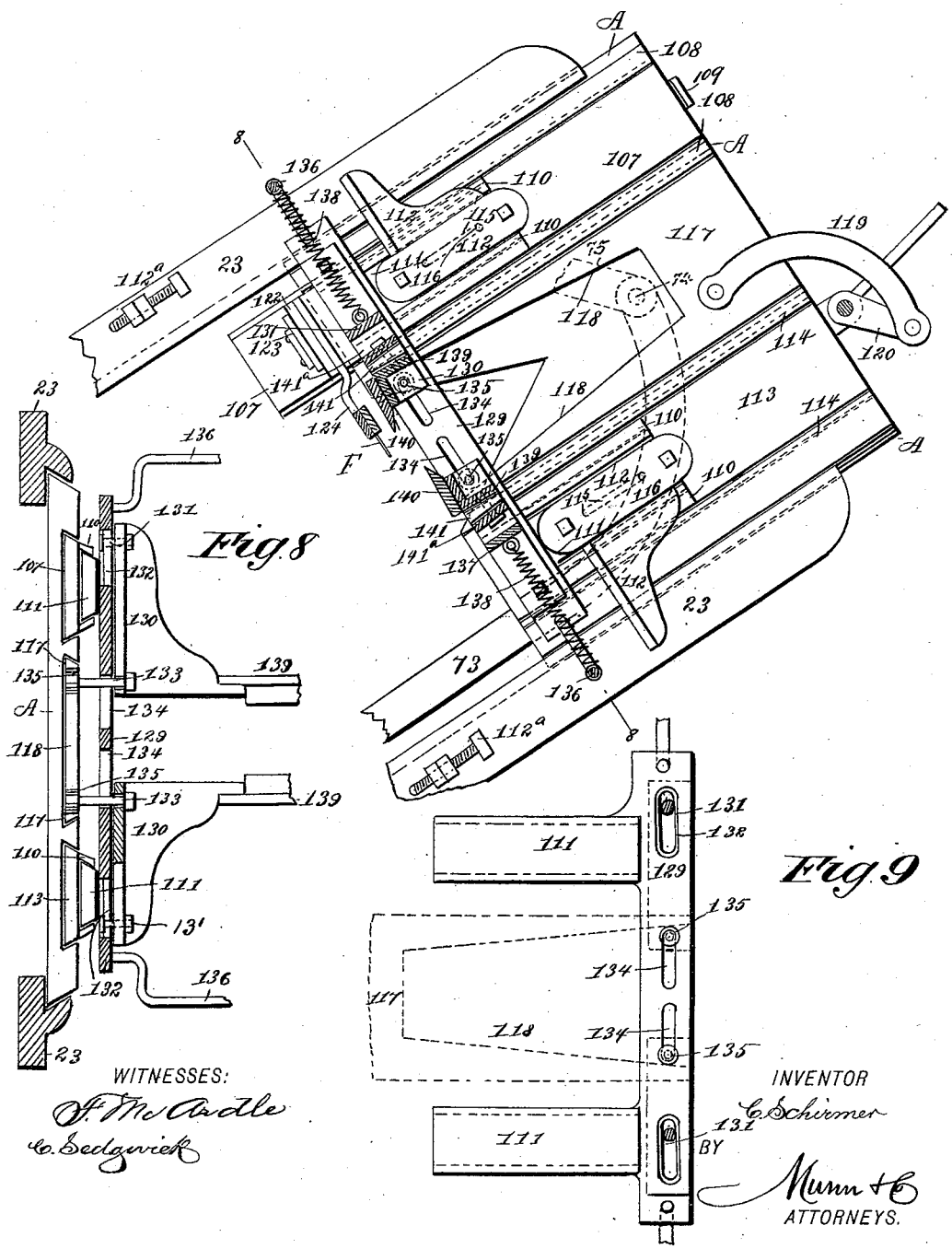
WITNESSES:
F. McArdle
C. Sedgwick
INVENTOR
C. Schirmer
BY
Munn & Co.
ATTORNEYS.

(No Model.) 9 Sheets—Sheet 8.
C. SCHIRMER.
MACHINE FOR DEHAIRING FUR SKINS.
No. 541,690. Patented June 25, 1895.
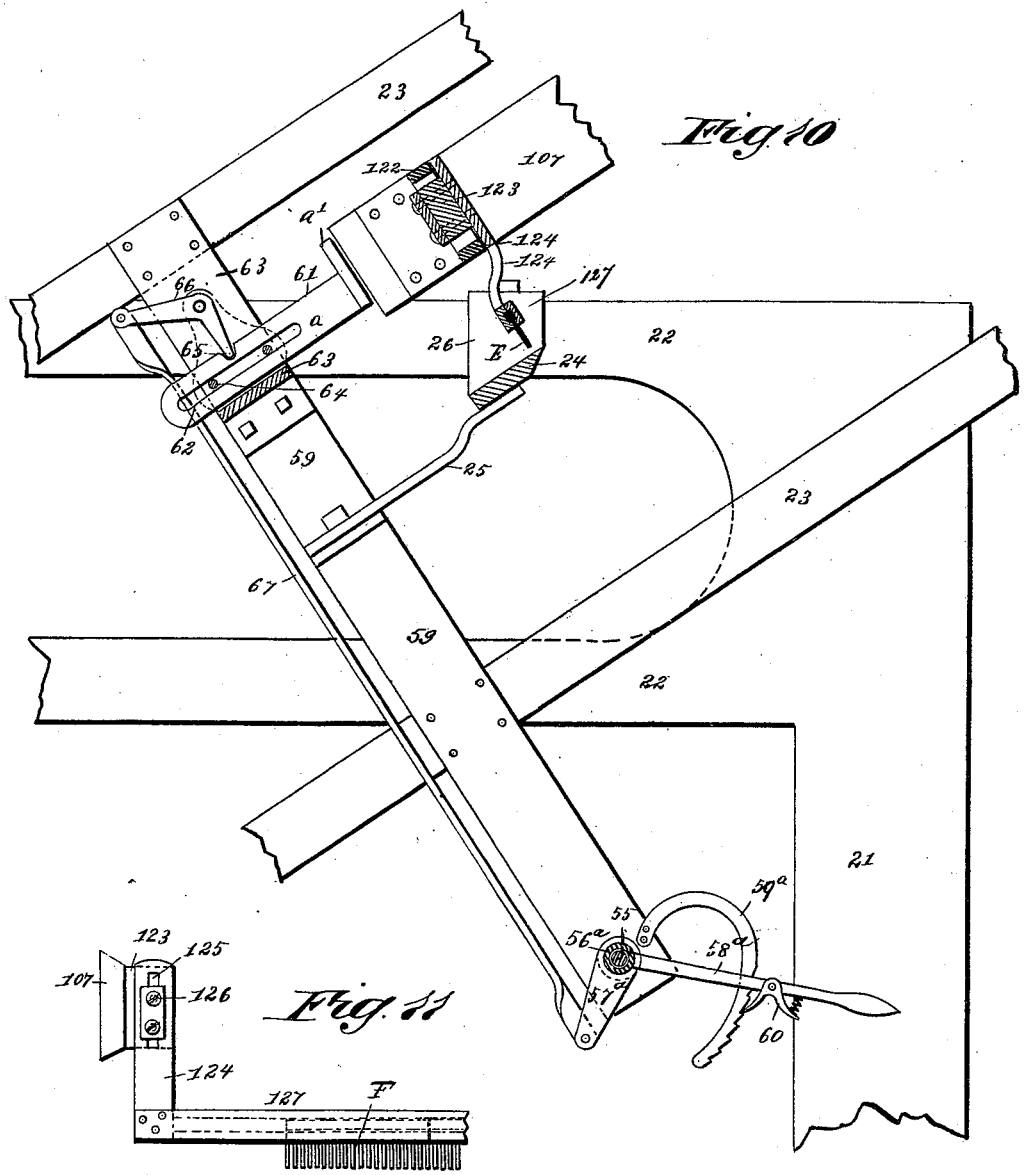
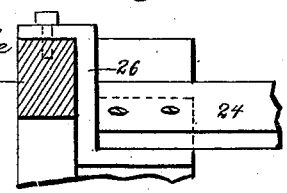
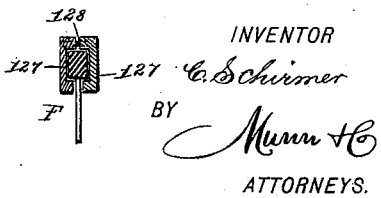

(No Model.) 9 Sheets—Sheet 9.
C. SCHIRMER.
MACHINE FOR DEHAIRING FUR SKINS.
No. 541,690. Patented June 25, 1895.
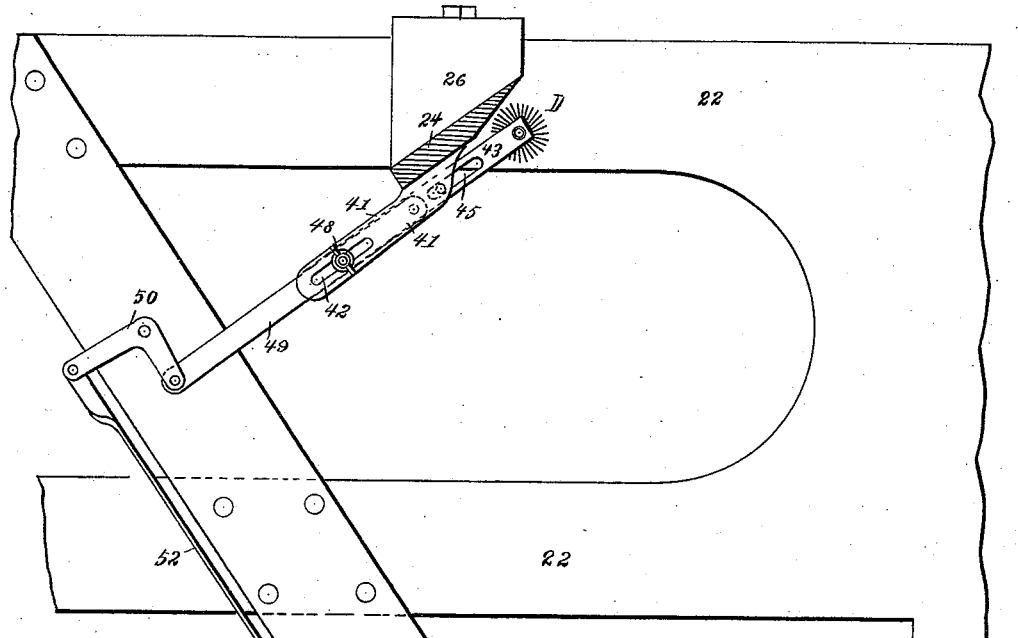
Fig. 14
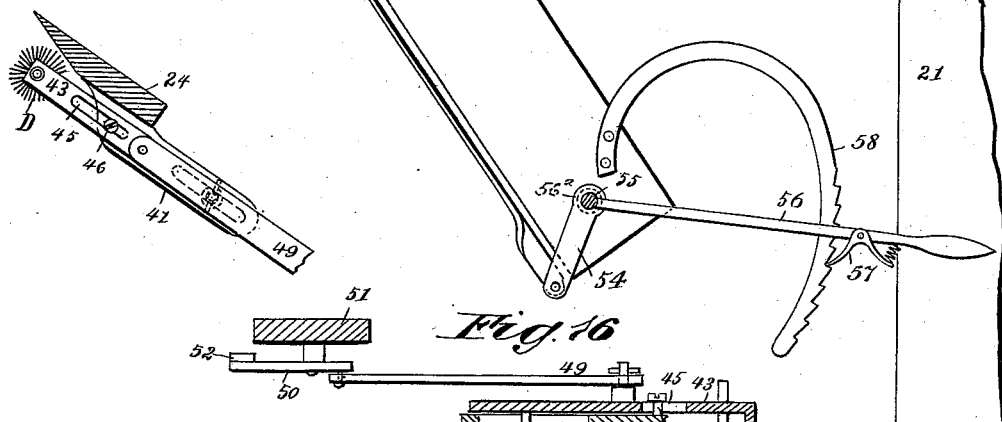
Fig. 15
Fig. 16
WITNESSES:
H. McArdle
C. Sedgwick
INVENTOR
C. Schirmer
BY
ATTORNEYS.

UNITED STATES PATENT OFFICE.

CONRAD SCHIRMER, OF BROOKLYN, NEW YORK, ASSIGNOR TO JAMES CAVANAGH, TRUSTEE, OF SAME PLACE.

MACHINE FOR DEHAIRING FUR SKINS.

SPECIFICATION forming part of Letters Patent No. 541,690, dated June 25, 1895.

Application filed August 2, 1894. Serial No. 519,278. (No model.)

*To all whom it may concern:*

Be it known that I, CONRAD SCHIRMER, of Brooklyn, in the county of Kings and State of New York, have invented a new and Improved Machine for Dehairing Fur Skins, of which the following is a full, clear, and exact description.

My invention relates to a machine for dehairing fur skins, and it has for its object to accomplish such a result in an effective manner and with a comparatively simple machine.

One of the objects of this invention is to provide two brushes used in connection with a comb for separating the fur to expose the hair or bristles contained therein, in order that they may be clipped by shears or equivalent devices, one of the brushes being a reciprocating brush, operating in conjunction with the comb, while the other brush is a rotating brush, but differs from other brushes of its class in this character of machine by being held in stationary yet adjustable bearings instead of being reciprocated, or given a forward or rear or vertical movement relative to the skin during the process of dehairing the same.

Another object of this invention is to provide a novel form of shears, capable of being rendered inactive whenever it is so desired, or of being brought into operation in an expeditious and convenient manner, the shears having a comparatively straight up and down cut, whereby they may be exceedingly strong, yet light.

Another object of the invention consists in providing a regular and proper feed for the skin under treatment, the said feed being automatic.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 2:
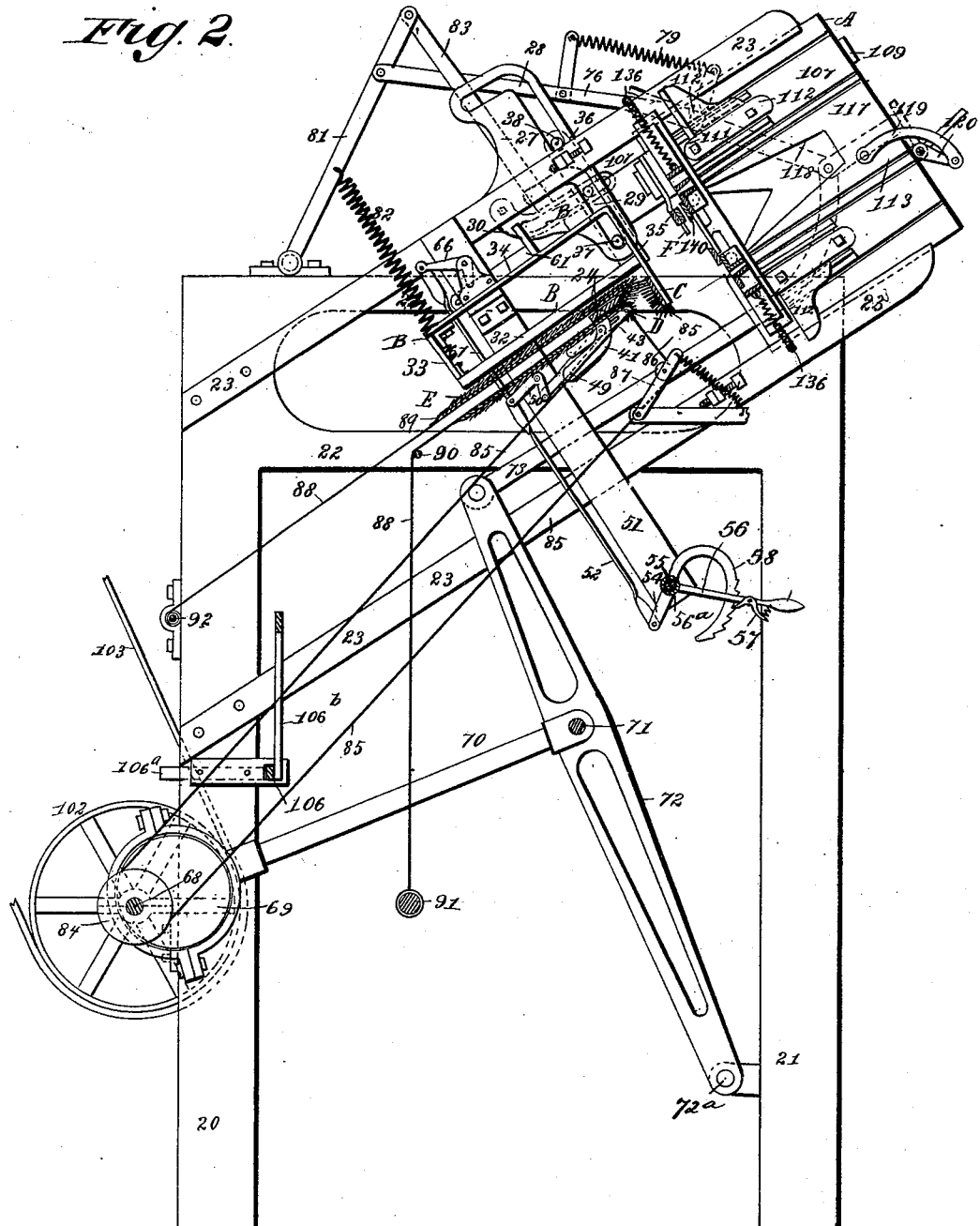
Figure 3:
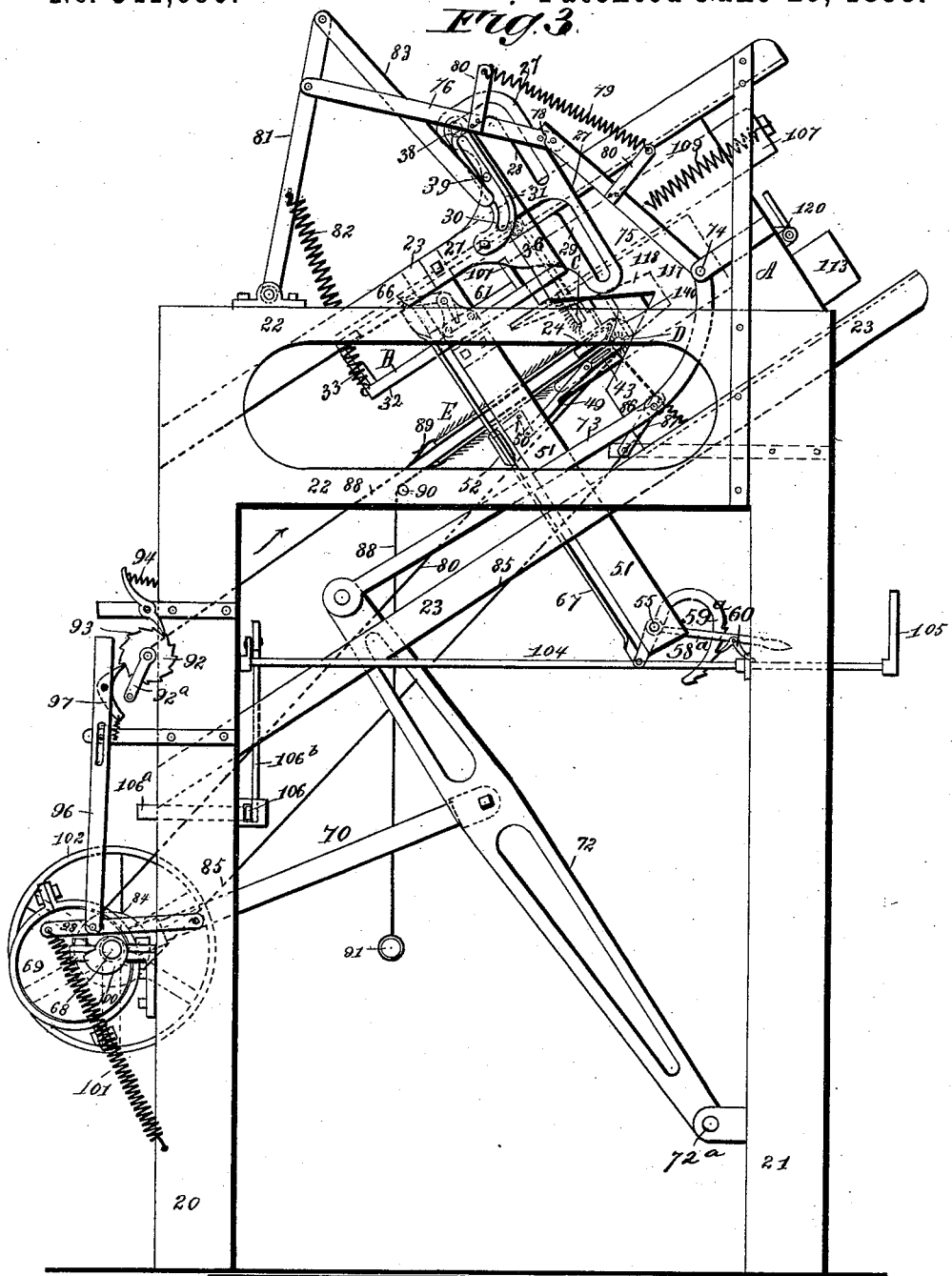
Figure 4:
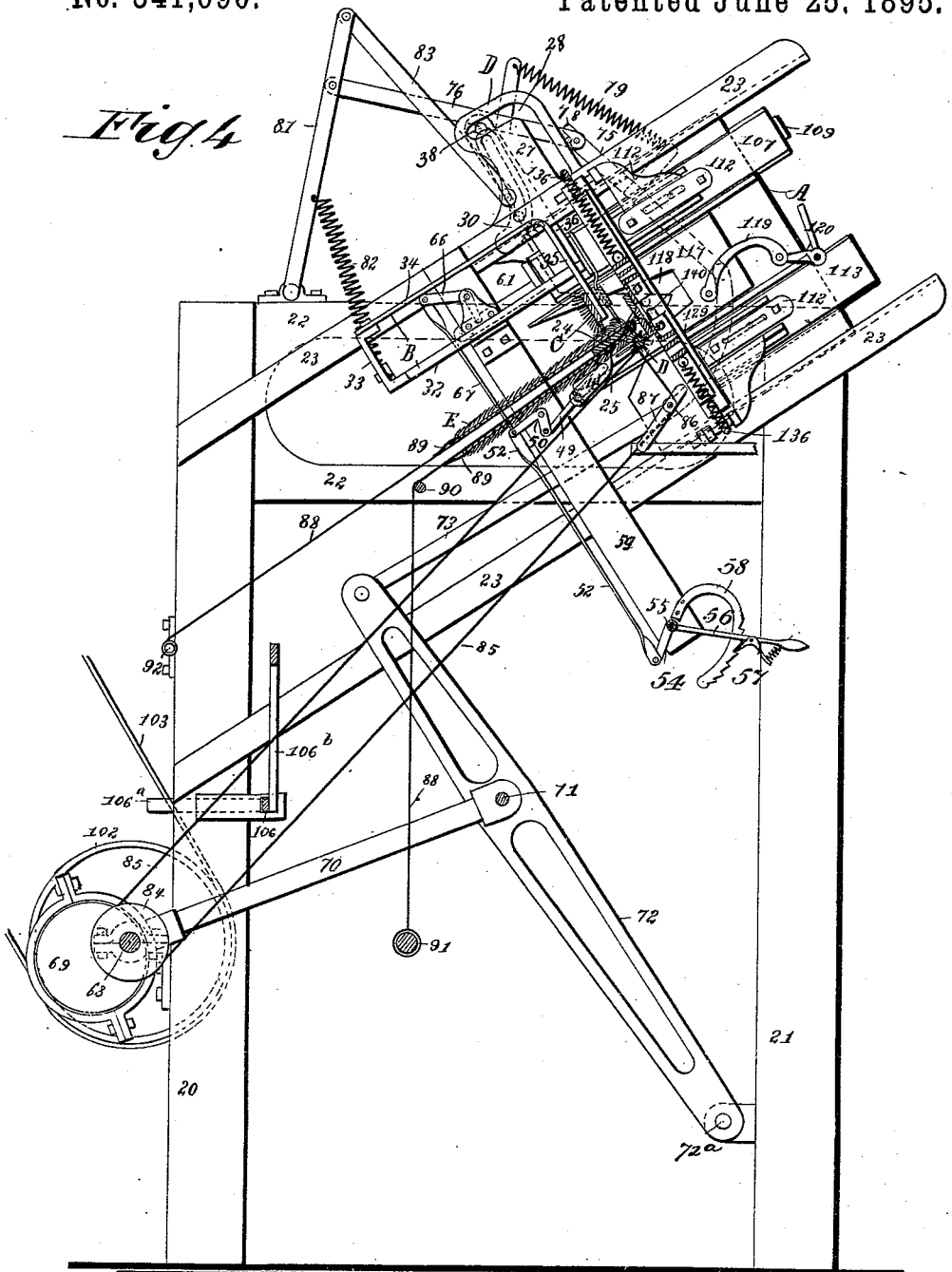
Figure 5:
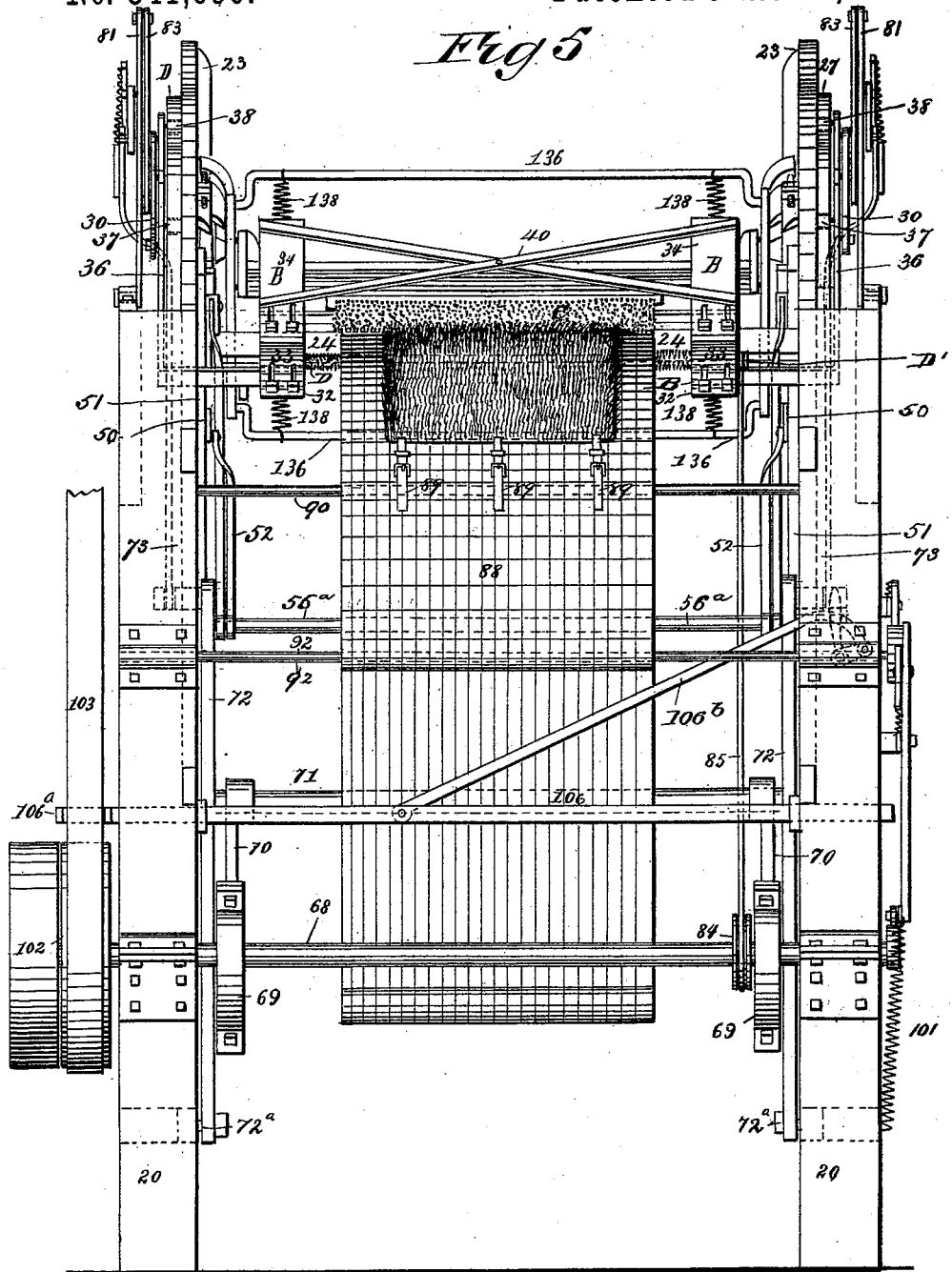
Figure 6:
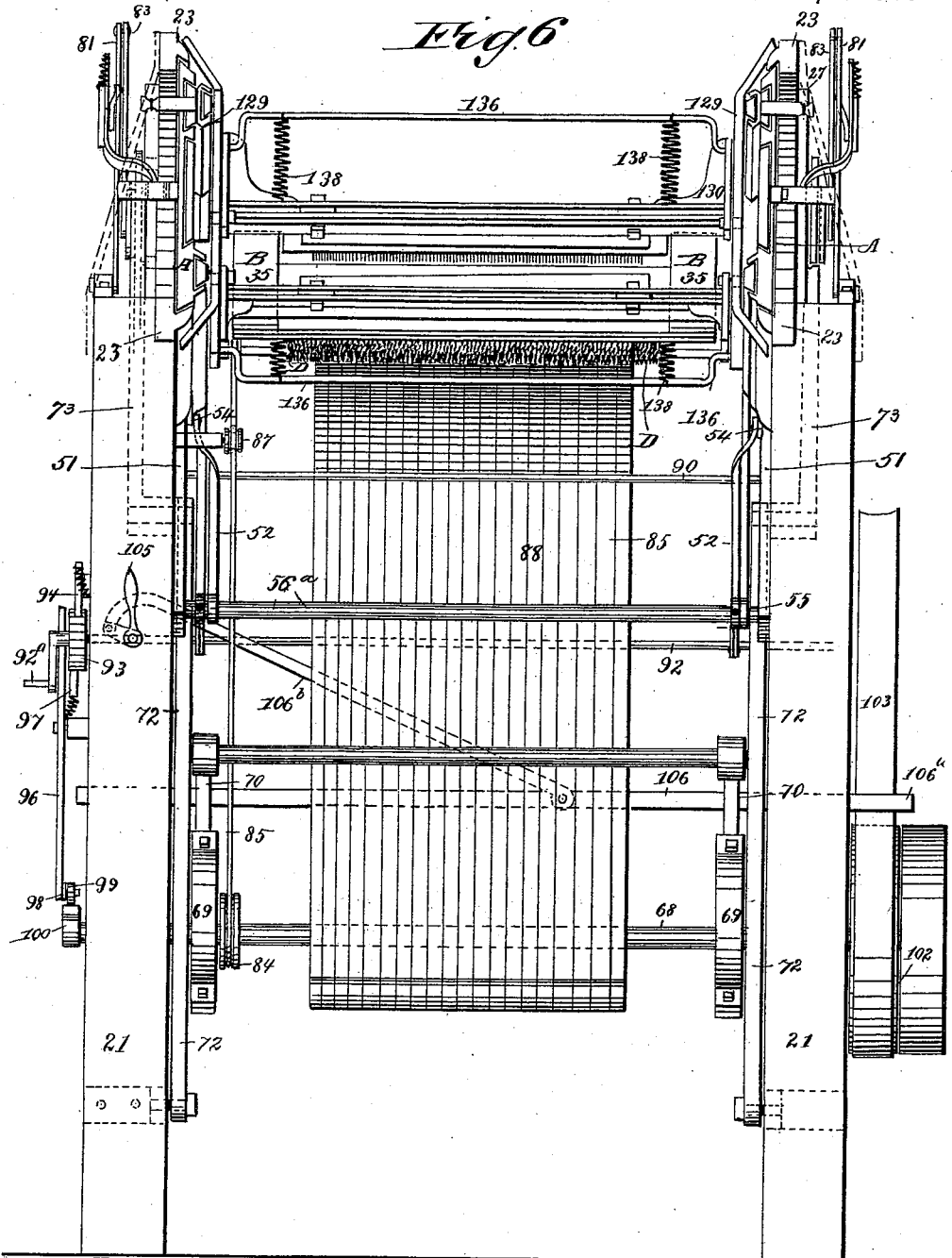

Figure 1 is a right-hand side elevation of the machine, the brush being in its lower position and the shears inactive. Fig. 2 is a vertical section taken near the center of the machine, with the parts in the position shown in Fig. 1. Fig. 3 is a right-hand side elevation of the machine, illustrating the reciprocating brush in its upper position, the comb as holding the fur back, and the shears as removing the hairs from the fur. Fig. 4 is a vertical section taken near the center of the machine with the parts in the position shown in Fig. 3. Fig. 5 is a front elevation of the machine with the shears closed. Fig. 6 is a rear elevation of the machine, the shears being open. Fig. 7 is an enlarged sectional view of the shears and an inner side elevation of one of the slides and the auxiliary slide carried thereby. Fig. 8 is a transverse section through the slide way of the main slide, illustrating in rear elevation the main slide and auxiliary slide. Fig. 9 is a detail view illustrating the connection of the shear-slides with the frame or supports for the shears. Fig. 10 is a sectional detail view illustrating the stop or check for the comb-slide and the manner in which it is operated and engaged by the said slide. Fig. 11 is a detail view illustrating the support for the comb and the manner in which it is constructed. Fig. 12 is a detail view illustrating the manner in which the stretcher board or horse is supported in the frame. Fig. 13 is a transverse section through the comb-case and comb. Fig. 14 is a sectional detail view illustrating the manner in which the rotary brush is adjusted and the location of said brush. Fig. 15 is a detail view further illustrating the detail construction of the brush-adjusting mechanism of the machine, and Fig. 16 is a sectional detail view of the entire adjusting mechanism and the bearings for the said brush.

In carrying out the invention, the frame of the machine may be said to consist primarily of standards 20 and 21 at each side, forming forward and rear legs, the said side standards being connected by an upper apertured plate 22, or the equivalent thereof may be employed. The opposing side standards 20 and 21, may be braced or connected in any desired manner, and the upper part of each side section of the frame is adapted to support two parallel tracks or slide ways 23, the said slideways having an inclination downward in direction of the front, and at or about the central portion of the opposing slide-ways, the stretcher board or horse 24 is supported in the frame, usually by means of brackets 25, as shown in Fig. 10, serving substantially as central supports and attached to a suitable cross bar, and brackets 26, which are secured directly to the upper side sections 22 of the frame, as shown in both Figs. 10 and 14. The horse or stretcher board, is inclined downwardly in direction of the front of the machine, and its rear edge is beveled from the top downward and forward.

At the rear of the stretcher board or horse a main slide A has movement in each set of slide-ways 23, the movement of the slide A being to and from the beveled edge of the horse or stretcher board. The main slides A, will be hereinafter termed sliding carriages, or carriages, inasmuch as they carry auxiliary slides, as will be hereinafter described.

Usually upon the outer face of each upper slide-way 23, a bracket plate 27 is vertically secured, the said bracket plate extending above and below the slide-way, as shown in Figs. 1 and 2. This bracket plate is provided with an upper angular, or substantially L-shaped slot 28, and a correspondingly shaped lower slot 29, and a link 30, curved at one end, is pivotally attached at said curved end to what may be termed the forward central portion of the bracket plate 27, as shown in Fig. 1, and this plate is adapted to assist in imparting movement to the brush carriage or frame B. This brush carriage or frame, as best shown in Fig. 2, is duplicated at each side of the machine, and consists of a base board or bar 32, a forward upright end bar 33, adjustably attached to the base, and a top bar or plate 34, adjustably attached to the end bar 33, the top bar or plate being made to extend rearward parallel with the base, and then downward below said base, having sliding movement on the upper or rear end of the base, the brush C, being attached to the downwardly-projecting rear portions of both of the carriages. The brush is provided with bristles upon its face opposed to the stretcher board or horse, and likewise with bristles on its lower edge, and this brush C is the reciprocating brush of the machine, and is intended to have an upward movement, in coming upward brushing the fur from the edge of the horse or stretcher board, and maintaining the hair in such position until the comb to be hereinafter described, serves as a substitute for the brush. The brush has, therefore, an angular or L-shaped course, and when it is returned to its normal position the bristles on the bottom of the brush will serve to brush or smooth the fur, restoring it to its original shape. The front extension of the brush carriages, holding the brush C, is designated in the drawings as 35.

The aforesaid angular reciprocating movement is imparted to the brush carriages in the following manner: A vertical arm 36 is secured to the outer surface of each carriage, and each of said arms is provided near the top and bottom with friction rollers designated as 37 and 38, and one of these rollers is made to travel in the lower slot 29 of the bracket plates 27, and the other roller in the upper slot 28. The arms 36 attached to the brush carriages are connected likewise with the links 30 pivoted on the said bracket plates, the attachment being accomplished by means of pins 39, projected outwardly from said arms, being made to travel in the slots of said links 30, as shown in Fig. 1, and in order to render the carriages B virtually one, they are connected by cross bars 40, as shown in Fig. 5, or the equivalents thereof, whereby the carriages are compelled to move in unison, and the brush carried thereby is not strained or carried out of proper alignment.

In addition to the reciprocating brush C a rotary brush D, is employed, or a brush adapted to have rotary motion. This brush is located near the beveled surface of the horse or stretcher board, as shown in Figs. 14 and 15, and is adapted to rotate in a forwardly direction and draw the hair downward from said edge as the reciprocating brush C carries the hair away from the upper portion of the working edge of the horse. This brush D is held to rotate in stationary bearings, but it is adjustable to and from the working edge of the horse, as is required by the length of the fur. To this end hangers 41, are preferably attached to the under face of the horse near each of its ends, and carried in a downwardly and forwardly direction, each hanger being provided with a slot 42 near its free end; and in connection with each hanger 41 a bracket 43 is employed, of angular construction. The longer member of each bracket is made to engage with the outer side surface of a hanger 41, as shown in Fig. 16, and the shorter members are made to extend substantially beneath the horse and carry boxes 44, secured thereto or adjustable thereon as may be desired; and in the boxes the ends of the rotary brush D are journaled, the brush being constructed in any suitable manner. It may here be remarked, that at or near one end of the brush a driving pulley D' (Fig. 5) is secured to the shaft or trunnion thereof.

In the longer member of each bracket 43 a slot 45, is produced, which receives a pin 46 provided preferably with a screw head and secured to the hanger 41, whereby the brackets are given sliding and guided movement on the hangers; and after the adjustment has been made a bracket may be secured rigidly upon a hanger through the medium of screws 47, attached to the brackets and passed through the slots 42 in the hangers, the said screws carrying at their free ends lock nuts 48.

It will be understood that the adjustment of the rotary brush may be accomplished by simply loosening the nuts 48 and moving the brackets 43 forward or rearward; but it is much more convenient to provide for an adjustment at the outer side of the machine, and at a point considerably beneath the horse. To that end a link 49, is pivotally attached to one of the brackets 43, as shown in Figs. 14 and 15, the said link being connected with a lever 50, preferably of the elbow type, fulcrumed upon a support 51, the latter being in the nature of a bar, and it is secured to the inner face of preferably the right-hand slotted plate 22 of the frame, extending rearwardly below said plate. The lever 50 is pivotally connected with a second link 52, the said link being in its turn pivotally connected with a crank arm 54, secured upon a shaft 55, journaled in the support 51, and in a corresponding support 59 at the opposite side of the machine as shown in Fig. 10. This shaft is rotated or rocked preferably through the medium of a hand lever 56, attached to the shaft and provided with a pawl 57 engaging with a rack 58, secured upon the lower portion of the right-hand support 51.

The shaft 55 carries a sleeve $56^a$ loosely mounted upon it, and at the left-hand side of the machine the sleeve is provided with an attached crank arm $57^a$, and the sleeve is rotated by means of a hand lever $58^a$, provided with a pawl 60, engaging with a rack $59^a$ attached to the support 59, as shown in Fig. 10. The crank arm $57^a$ and hand lever $58^a$, are adapted to operate a check or stop 61, which I denominate a comb slide check or stop, since it is adapted to limit the forward movement of the slide carrying the comb, and permits the comb to travel a greater or less distance forward from the working edge of the horse or stretcher board. This check or stop comprises a body section $a$ and a vertical member $a'$, the latter to be engaged by the comb slide above referred to. The body portion of the check or stop is provided with a slot 62, and is held to slide upon an angled bracket 63. I desire it to be understood that one of these check or stop slides is located at each side of the machine, since a comb slide is located at both of said sides; and both of the checks or stops are operated from the sleeve $56^a$.

The operation is performed in the following manner: Pins 64, located upon the brackets 63 extend through the slots 62 in the body portion of the checks, and a recess 65, is produced in the upper edge of the body portion. Each recess 65 is entered by one member of an angle dog 66, and each of these dogs is connected with a connecting rod 67, which in turn is pivotally attached to a crank arm $57^a$, connected with the sleeve $56^a$ and heretofore referred to. Thus by turning the sleeve $56^a$ upon the shaft 55 from one side of the machine, both of the checks or stops 61 will be carried either forward or rearward according to the direction in which the lever $58^a$ is carried. The main or driving shaft 68, is journaled in suitable bearings at the front of the frame of the machine, and the said shaft is provided within said frame with two eccentrics 69, each eccentric having secured to it a connecting rod 70, the rods being attached to a shaft 71, and upon this shaft two pitmen 72 are secured, at or near their centers, one at each side. These pitmen are pivoted to the frame at their lower ends, shown at $72^a$ in the drawings. Through the medium of these pitmen the main slide or carriage A, together with the brush carriage B, is operated.

At each side of the machine is arranged a link 73, one end of which is pivotally attached to the upper end of each pitman 72, and these links are carried rearward, being preferably upwardly curved at their rear ends, and pivoted to a stud or pivot pin 74, one of which is secured upon the upper face of each main carriage or slide A, at or near its center. A second link 75, is pivoted upon the same pivot pin 74, and the link 75 is connected with a third and forwardly extending link 76 by means of a rule joint 78, which permits the two links to break at their pivotal connection in an upwardly direction, as it were, and they are substantially integral when pressed in a downwardly direction. A spring 79, is located over the rule joint connection between the links 75 and 76, the ends of the spring being attached to upwardly extending arms 80, attached one to each link, as shown in Fig. 1. The forward ends of the links 76, as it will be understood that this mechanism is duplicated at each side of the machine, are pivotally connected with lever arms 81, fulcrumed upon the upper forward portion of the main frame of the machine, and springs 82, connect said arms with the frame sections of the reciprocating brush carriage; and the upper end of each lever arm 81, is connected by means of a link 83 with the links 30 in direct connection with the said brush carriage. Thus it will be observed that as the main shaft 68 is revolved, the slide carrage A is moved forward and backward in its ways 23, and through the link mechanism just described the brush carriage is made to reciprocate in an angular direction vertically and horizontally over the horse or stretcher board, both forward and backward.

A pulley 84, is secured upon the drive shaft 68, and this pulley carries an endless belt 85, adapted for driving the rotary brush D. This belt 85, is passed over a suitable pulley located on the brush shaft or trunnion, and over a tension pulley 86, carried by a spring-controlled arm 87 attached to the frame. Thus when the brush is adjusted, the belt can move with the brush and yet be under constant and proper tension.

The fur skin E to be treated, is placed upon an apron 88. This apron is made to pass over and around the working edge of the stretcher board or horse and beneath the same, and the skin is attached to both the upper and the lower stretches of the apron through the medium of straps 89, or their equivalents. The lower stretch of the apron is made to pass downward over a guide bar 90, located in the forward portion of the frame and considerably below the plane of the stretcher board or horse, and upon the lower end of this stretch of the apron a weight 91 is attached, sufficient to constantly keep both apron and skin tightly drawn over the board, bar or horse 24; while the opposite end of the apron is wound around a shaft 92, journaled in suitable bearings at the front portion of the machine. This shaft carries at one of its ends, the right-hand end, for example, a crank arm or handle 92$^a$ and a ratchet wheel 93, the latter being engaged by a spring-pressed detent 94 and a spring-controlled dog 97, the latter being attached to a lift bar 96, which is slotted to receive a pivot located upon an arm 95, projected forwardly from the frame. The lower end of the lift bar 96, is pivotally connected with a lower arm 98, pivoted in its turn to the frame of the machine, and this lower arm is provided with a friction roller 99, engaging with a cam 100 secured upon the drive shaft 68. A spring 101, is secured to the upper or forward end of the lower cam-operated arm 98, and to the frame of the machine, said spring serving to keep said arm in constant engagement with the cam. Thus in the operation of this machine, at each revolution of the main or drive shaft, the lift bar 96 is carried upward and its dog operates upon the ratchet, turning the same sufficiently to unreel a given amount of the apron from the shaft 92, whereupon the weight 91 immediately takes up the slack of the apron, and the fur skin is drawn over the horse or stretcher board a sufficient distance to present another surface to be dehaired.

A driving pulley 102, is mounted upon the drive shaft 68, and is driven by a belt 103, carried from any source of power. The shifting of the belt is accomplished usually from the rear of the machine through the medium of a rock shaft 104, journaled in the frame and controlled by a handle 105, the said rock shaft 104 being connected with a shifting fork 106$^a$, receiving the belt 103, by means of a pitman 106$^b$, the said fork being mounted upon a sliding bar 106, as shown in Figs. 1, 3 and 5.

Upon the upper portion of each carriage slide A, what I denominate a comb slide 107 has forward and rear movement in slide-ways 108, the comb slide being held normally with its rear end sufficiently flush with the rear of the carriage slide, through the medium of a spring 109, shown in Figs. 1 and 3. Upon the forward portion of the comb slide, ways 110 are constructed, in which what I denominate a shear slide 111 has forward and rear movement, it being understood that the comb slide and the shear slide are duplicated at both sides of the machine.

The shear slide has bolted or otherwise secured upon it an arm 112, adapted to stop the shear slide from forward movement by engaging with adjustable stops 112$^a$, mounted upon the upper main slide-ways 23, as shown best in Fig. 7. The comb slide and shear slide are mounted upon the inner face of the carriage slide, and upon the lower portion of this face the carriage slide is provided with a slide 113, having corresponding movement to the comb slide, and upon this slide a second shear slide is mounted, identical in construction and numbered the same as the upper corresponding slide, the slide 113 being employed primarily to bring the upper and lower shear slides upon each carriage slide in alignment with each other.

The ways in which the slides 113 have movement, are designated at 114. The movement of the shear slides upon the comb slides and the lower slides 113, is limited by producing in the shear slides slots 115, and locating pins 116 in the said comb slides and the slides 113, adapted to travel in said slots, as shown in dotted lines in Fig. 7.

A shear closing slide 117, is mounted to have forward and rear movement upon the central portion of the inner face of each carriage slide, and the shear-closing slides are provided with substantially V-shaped slots 118 in their forward edges, or slots of substantially such shape, as is also shown in Fig. 7. These shear-closing slides may be removed from the shears to be hereinafter described, and thus render the shears inoperative, which is accomplished by a suitable mechanism, the said mechanism ordinarily consisting of links 119, attached to the slides and connected with crank arms 120, operated from the outer side faces of the machine.

The comb slides 107 near their forward ends are provided preferably with bracket slides 122 attached thereto, and a block 123, is located in each of said slides, being vertically adjustable therein, as shown in Figs. 10 and 11. Each block 123 has an arm 124 projected downward from it, and the said arms are provided with slots 125 through which bolts 126 are passed into the blocks, so that the blocks are not only adjustable in their slides, but the arms 124 are adjustable upon the blocks.

The arms 124 support and have attached to them a comb casing 127. This casing is preferably made in two parts as shown in Fig. 13, the upper portions of the sections being connected by suitable screws 128 or their equivalents. The comb F is likewise made in sections, and the body portion of the comb is held in the casing while the teeth extend downward therefrom, the comb being made in sections in order that should any of the teeth break an entire new comb need not be substituted, but only the section damaged need be removed and another section be introduced.

The carriage adapted as a support for the shears consists of the shear slides 111 heretofore mentioned, and side bars 129 attached, one side bar to each set of shear slides at each side of the machine. Each side bar 129 of the shear carriage, is provided with two brackets 130 upon its inner face, and the said brackets have limited sliding movement upon the side bars in a vertical or longitudinal direction, the brackets moving to and from each other.

To that end the brackets are provided at their outer ends with bolts 131, having movement in slots 132 produced in the upper and lower portions of the side bars, as shown in Figs. 8 and 9; and at the inner end of each bracket a pin 133 is secured, which extends through slots 134 made longitudinally one at each side of the central portion of the bars; and the said pins extend rearward a sufficient distance to be within the path of the shear-closing slide 117, the pins 133 being provided at their outer ends with friction rollers 135 adapted to travel in engagement with the inclined walls of the slots 118 in the shear-closing slides. Therefore, as the shear-closing slides are advanced by the advance movement of the slide carriage A, the taper of the walls of said slots in the slides with which the rollers 135 engage, will serve to draw the brackets 130 together, the brackets being adapted to carry the blades or cutters of the shears; and as the shear-closing slides recede, the brackets are restored to their normal position, separating the blades of the shears, by means of springs 138, attached to cross bars 137 connecting the opposing upper and lower brackets of the shear carriage, as shown in Fig. 7, the springs being likewise attached to cross bars 136, located at top and bottom of the side bars 129 of the said carriage. An angle bar 139, has a bracket engagement at its ends with each of the upper and lower sets of brackets, and upon these angle bars the shear blades 140 are secured, as is likewise shown in Fig. 7; and these blades may be given any desired inclination by introducing wedges 141, or square blocks if desired, between the backs of the angle bars supporting the blades, and bars 141ª loosely connected with said blade bars and with the brackets. The shears are located back of the comb, and the comb slides travel forward preferably a greater distance than the shear slides, or slides of the shear carriage.

In the operation of this machine, the normal position of the parts is illustrated in Figs. 1 and 2, and in said figures the shear-closing slides have been carried back so that the machine can be operated so as to ascertain if the brushes and comb are properly adjusted without bringing the shears into action. The position of the comb over the horse or stretcher board is regulated by the forward or rearward adjustment of the stops 61 operated by the lever 58ª, shown in Fig. 1, and the reciprocating brush C, is adjusted by adjusting the members of its carriage or frame, and the rotary brush D is manipulated through the medium of the lever 56, shown in Fig. 2. The position that the shears shall occupy with reference to the skin being treated, is determined by the adjustment of the stops 112ª. These adjustments having been satisfactorily made, the shear-closing slides are thrown in position for work, said position being illustrated in Figs. 3 and 4. The skin to be treated is placed upon the apron 88 after being passed over the horse or stretcher board, and is secured to said apron at its ends. As the drive shaft revolves, the rotary brush is set in operation, brushing the fur constantly from the working edge of the horse, and through the medium of the links heretofore described and operated from the main shaft, the brush carriage is given first a vertical movement, causing the reciprocating brush C to brush forward the fur from the working edge of the horse or stretcher board, thereby exposing the hair in the fur at said working edge, and next the reciprocating brush has a rearward movement, passing forwardly over the top of the fur. In the meantime, the slide carriage A will have been moved forward by the same link connection operating the reciprocating brush, and the comb F will have followed directly behind the reciprocating brush upon its forward movement, maintaining the fur smoothed forwardly by the said brush in that position, and the comb will have stopped a sufficient distance forward of the working edge of the horse to hold the fur, whether it be long or short, in its flat position, the comb stopping when the comb slides shall have had contact with the stops 61 provided to receive them. Meanwhile, the slide carriage moves forward, the comb slides moving rearward in the said carriage, placing their springs 109 under tension, as shown in Figs. 3 and 4. The shear slides continue forward with the slide carriage, carrying forward the shear carriage until the shear slides shall engage with the stops 112ª, at which time the shear blades will be in position to cut the exposed hair from the fur. At this time the slide carriage moves still farther forward, in fact a sufficient distance to permit the shear-closing slide 117 to operate upon the friction rollers 135 of the shear carriage and draw the brackets carrying the shear blades together, consequently causing said blades to substantially meet, as shown in Fig. 4, and sever the hair. The carriage now moves rearward, and the parts restore themselves to their first position, while the shifting mechanism actuated from the drive shaft will now act upon the winding shaft 95 to release sufficient of the apron 88 to permit the weight 91 to shift the position of the skin and bring another surface over the working edge of the horse or stretcher board, to be treated by the machine in like manner as has been just described.

Having thus described my invention, I claim as new and desire to secure by Letters Patent—

1. In a fur-dehairing machine, the combination of a horse a reciprocating brush having a working surface at one side and at its bottom, the said brush being provided with means for imparting thereto reciprocatory movement in a vertical direction in front of the working edge of the horse, and in a substantially lateral direction across the upper face of the said horse, as and for the purpose set forth.

2. In a fur-dehairing machine, the combination, with the horse, of a rotary brush mounted in bearings held stationary during operation, the said bearings, means for adjusting the brush toward and from the working edge of the horse, the said brush being located at the lower portion of the working edge of the said horse, a carriage, means for imparting thereto a reciprocating motion over the said horse, and a brush supported from said carriage, which brush in the travel of the carriage passes upward substantially in contact with the working edge of the horse and across its upper face, the rotary brush being adapted to draw the fur downward from the working edge of the horse and the reciprocating brush being adapted to lay the fur from said edge over the upper surface of the horse, as and for the purpose specified.

3. In a fur-dehairing machine, the combination, with the horse, of a rotary brush mounted in bearings held stationary during operation, the said bearings, means for adjusting said brush toward and from the working edge of the horse, the said brush being located at the lower portion of the working edge of said horse, a carriage, means for imparting thereto a reciprocating movement over the said horse, and a brush supported from said carriage, which brush in the travel of the carriage passes upward substantially in contact with the working edge of the horse and across its upper face, the rotary brush being adapted to draw the fur downward from the working edge of the horse and the reciprocating brush being adapted to lay the fur from said edge over the upper surface of the horse, and a comb having means for imparting thereto reciprocating movement to and from the horse, the said comb following the reciprocating brush across the upper face of the horse, as and for the purpose specified.

4. In a fur-dehairing machine, the combination, with a horse, a rotating brush held in stationary bearings below the working edge of the said horse and substantially in contact therewith, the said bearings and a carriage, means for imparting thereto a reciprocating movement over said board and carrying a brush which in the movement of the carriage traverses in a vertical direction the working face of the horse and in a lateral direction its upper surface, of a carriage adapted for movement to and from the said horse, a comb supported by the carriage and adapted for movement with reference to the brush carriage, the said comb following the reciprocating brush over the face of the horse, adjustable stops to limit the movement of the comb over the horse, shears likewise supported by the carriage supporting the comb, and means for closing the shears when the carriage centers them at the working edge of the said horse, as and for the purpose set forth.

5. In a fur-dehairing machine, the combination, with a horse, a rotary brush located beneath the working surface of the said horse, engaging with said surface, devices for adjusting the rotary brush substantially as described, a carriage, means for imparting thereto a reciprocating movement, and a brush adjustably supported by the said carriage, adapted in the movement of the carriage to traverse the working edge of the horse and travel across its upper face, of a carriage slide, comb slides mounted in said carriage slide, adjustable stops adapted to limit the movement of the comb slides in direction of the horse, a comb secured to the said slides, a sliding carriage mounted in the carriage slide, shears located in said carriage, the said shears comprising two blades adapted for movement to and from each other, adjustable stops limiting the movement of the shear slide in direction of the horse, and an adjustable closing slide located in the carriage slide and adapted to draw the blades of the shears in direction of each other, substantially as set forth.

6. In a fur-dehairing machine, the combination, with the horse, of a carriage having means for imparting thereto reciprocating movement over the said horse, and a brush mounted on the said carriage, adapted to cross the working edge of the horse in a vertical direction and travel over the upper face thereof, the brush being shaped to engage with the horse when traveling in both directions, as and for the purpose specified.

7. In a fur-dehairing machine, the combination, with a horse, of a rotary brush held below and substantially in contact with the under surface of the working edge of the horse, boxes journaling the said brush, a support upon which the boxes are adjustably mounted, locking devices whereby the boxes in the operation of the brush may be rigidly secured to said support, an adjusting lever, and a link connection between the said adjusting lever and the said boxes of the brush, as and for the purpose specified.

8. In a fur-dehairing machine, a comb case consisting of sections detachably connected, the case being open at one of its sides, and a comb constructed in equal sections, the body of each section being secured between the sections of the case, with its teeth projecting therefrom, as and for the purpose specified.

9. In a fur-dehairing machine, the combination of a frame, a horse, having a working edge and a plane face adjacent thereto, a brush and means for moving said brush across the working-edge of the horse and along the plane face thereof away from said working edge, substantially as set forth.

10. In a fur-dehairing machine, the combination of a frame, a horse having a working edge and plane faces on opposite sides thereof, a brush rotatively mounted adjacent to and adapted to operate on one plane face of the horse beyond but at a point closely adjacent to the working edge thereof, a reciprocating brush, and means for moving said reciprocating brush across the working edge of the horse and across the other plane face thereof, substantially as set forth.

11. In a fur-dehairing machine, the combination of a frame, a horse, having a working edge and a plane face adjacent thereto, a brush, means for moving said brush across the working edge of the horse and along the plane face thereof, a comb, and means for moving said comb along the plane face of the horse in the rear of said brush, substantially as set forth.

12. In a fur-dehairing machine, the combination of a frame, a carriage mounted to slide therein, a horse arranged in the frame with its working edge adjacent to the path of the carriage, slides arranged on the carriage and adapted to move in a direction parallel to the path thereof, a comb carried by said slides, a stop to limit the movement of said comb, brackets mounted on the said slides and movable transversely of the path of the carriage, shears carried by said brackets, a closing slide carried on and adapted to move with said carriage and mechanism actuated by said closing slide for imparting reciprocatory movement to said brackets, substantially as set forth.

13. In a fur-dehairing machine, the combination of a frame, a carriage mounted to slide therein, a horse arranged in the frame with its working edge adjacent to the path of the carriage, slides mounted on the carriage and adapted to move in a direction parallel to the path thereof, a comb carried by said slides, a stop to limit the movement of the comb, brackets mounted on the carriage and adapted to be moved toward and from one another, and also to be moved parallel to the path of the carriage, shears carried on said brackets, stops to limit the movement of the brackets, parallel to the path of the carriage, a closing slide, and mechanism actuated by the closing slide for imparting movement to said brackets transversely of the path of the carriage, substantially as set forth.

14. In a fur-dehairing machine, the combination of a horse, a rotary brush adapted to operate at the lower portion of the working edge of the horse, a carriage mounted to slide in the frame adjacent to the horse, a comb movably mounted on said carriage, and means for adjusting said rotary brush and comb, substantially as set forth.

CONRAD SCHIRMER.

Witnesses:
WILLIAM WEGENER,
WILLIAM R. EISELE.